Jan. 1, 1957 C. L. VAGNEUR 2,775,899
MECHANICAL MOVEMENT FOR RECIPROCATING MACHINES
Filed April 26, 1954
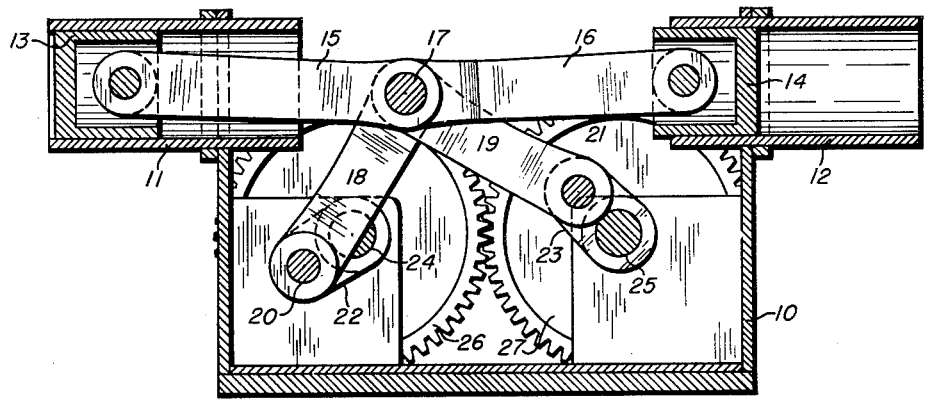
FIG. - 1
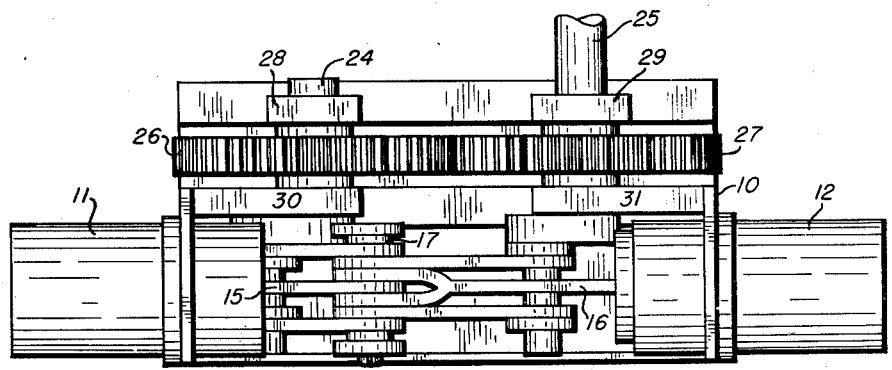
FIG. - 2
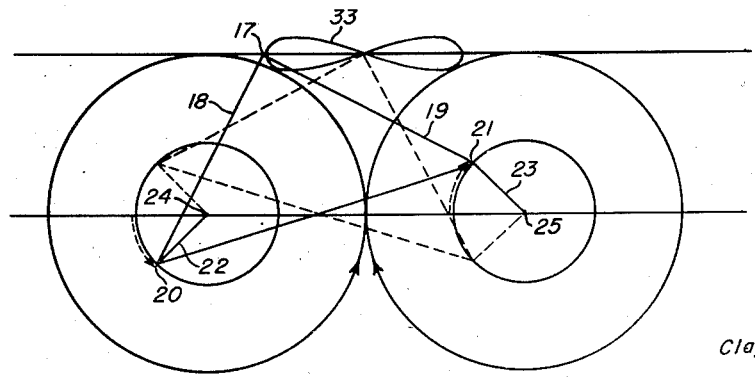
FIG - 3
INVENTOR.
Clayton L. Vagneur
BY
ATTORNEYS United States Patent Office 2,775,899
Patented Jan. 1, 1957

2,775,899
MECHANICAL MOVEMENT FOR RECIPROCATING MACHINES

Clayton L. Vagneur, Denver, Colo.

Application April 26, 1954, Serial No. 425,571

4 Claims. (Cl. 74—44)

This invention relates to mechanical movements, and more particularly to an improved mechanical movement for transferring power between a rotary member and a reciprocating member and which is applicable to internal combustion engines, pumps, and the like.

Many mechanical movements have been devised for power drives with a view to securing more effective transfer of power between a rotating shaft and a reciprocating member such as a piston; among these devices are mechanical linkages which are designed to convert the rotary movement of the crank to approximately straight line movement and thereby minimize side thrust on the piston. In general these devices have been complex and have employed many moving parts and many bearing surfaces; some have required cross heads in addition to the mechanical linkage. Others while approximating straight line motion have sacrificed mechanical advantage. Accordingly, it is an object of this invention to provide a simple and rugged mechanical movement for converting rotary motion to reciprocating motion and vice versa including an improved mechanism for minimizing side thrust on the reciprocating member while affording highly effective transmission of power.

Further objects and advantages of this invention will become apparent as the following description proceeds and the features of novelty which characterize the invention will be pointed out with particularity in the claims annexed to and forming a part of this specification.

Briefly in carrying out the objects of this invention in one embodiment a mechanism is provided for driving a pair of aligned reciprocating pistons from a rotating shaft through a linkage which provides a power transmitting member moving at all times in close proximity to a line parallel to the line of movement of the pistons. The mechanism includes a pair of meshing gears of the same pitch diameter, one mounted on the power shaft and the other on another shaft parallel to the power shaft and spaced the same distance from the line of movement of the pistons. Cranks are provided on the shafts which when extending along a line through the centers of the shafts and parallel to the line of movement of the pistons both lie on the same side of their respective shafts. The cranks which rotate in opposite directions are connected to drive the pistons through a pair of links pivoted together on the connecting rods to the pistons at one end and to the cranks at their other ends. To secure the required movement approximating straight line of movement the two links are made of equal length and this length is made equal to the distance between the centers of the cranks when they are both at angles of 45 degrees to the line through the centers of the crank shafts divided by approximately the square root of two.

For a better understanding of the invention, reference may be had to the accompanying drawing in which:

Fig. 1 is a schematic front elevation view of a mechanism embodying the invention;

Fig. 2 is a plan view of the mechanism shown in Fig. 1; and

Fig. 3 is a diagram illustrating the characteristics of movement of the mechanism.

As shown schematically in Figs. 1 and 2, the mechanical movement of this invention has been illustrated as applied to an internal combustion engine, two cylinders of which are illustrated. The engine comprises a base 10 providing a crank case in the usual manner and on which are mounted cylinder blocks providing cylinders 11 and 12 therein. The engine valves, valve actuating mechanism, cylinder heads and spark plugs have been omitted as they are not necessary to an understanding of the invention. Pistons 13 and 14 are mounted in the cylinders 11 and 12 respectively, and are provided with connecting rods or links 15 and 16, respectively, pivoted to the pistons and to a common pivot 17. The link 16 is bifurcated as clearly shown in Fig. 2 so that it engages the pivot 17 on either side of the link 15 and the links are in the same plane. The pivot 17 is connected by a pair of links 18 and 19 which have their other ends pivotally connected at 20 and 21 to a pair of cranks 22 and 23 mounted respectively on parallel shafts 24 and 25. The shaft 25 as indicated in Fig. 2 is the power take-off shaft of the engine. The shafts 24 and 25 are locked to rotate together at the same angular velocity by a pair of meshing gears 26 and 27. The shafts 24 and 25 are mounted in bearing blocks 28 and 29 on one side of the gears 26 and 27 and bearing blocks 30 and 31 on the other side of the gears.

As shown in Fig. 1 the pistons 13 and 14 are in their extreme lefthand position and the cranks 22 and 23 are at angles of 45 degrees to the horizontal line through the centers of the shafts 24 and 25. In this position the links 18 and 19 are at right angles to one another. If the cranks are now rotated 90 degrees in either direction, the links 18 and 19 will again lie at right angles to one another. This latter position is the position of the pivot 17 when the pistons 13 and 14 are in their mid positions, and when the cranks are rotated another 90 degrees the pivot 17 reaches its far righthand position when the links 18 and 19 are again at right angles to one another and the cranks 22 and 23 at 45 degrees to the plane through the centers of the shafts 24 and 25. Between the three points at which the links are at 90 degrees to one another as just described, the pivot 17 follows curved paths, all of which are identical in curvature but which form a substantially flat figure 8 as clearly indicated in Fig. 3 by the curve 33.

From Fig. 3, it is apparent that the pivot point 17 which moves along the curve 33 touches three points on a plane parallel to the plane through the centers of rotation of the shafts 22 and 23. In order to secure this curve, the links 18 and 19 are made of equal length determined by dividing by the square root of two the distance between the axes of the crank pivots 20 and 21 when the cranks are at 45 degrees to the plane through the axes of the shafts 24 and 25. It will be apparent from Fig. 3 that this relationship applies because, when the cranks are in their 45 degree positions, the links 18 and 19 form a right triangle with a line between the centers of the crank pivots 20 and 21. The hypotenuse of the triangle is the distance between the centers of the crank pivots and the length of either side is equal to the length of the hypotenuse divided by the square root of two. In Fig. 3 the positions of the cranks and links when at the extreme left end of the travel of the pivot 17 are shown in full lines, the positions of the several parts being designated by the numerals corresponding to the parts of the mechanism which they represent. The smaller circles in Fig. 3 represent the paths of movement of the centers of the crank pivots 20 and 21 and the larger circles represent the pitch circles of the gears 26 and 27. It will now be seen that the curve 33 lies with three points on a line parallel to a line through the centers of the shafts 24 and 25 and that this line is tangent to the pitch circles of the two gears. In dotted lines the positions of the crank arms and links is indicated when the pivot 17 lies in its midposition, the cranks 22 and 23 having been rotated 90 degrees from their position as shown in the full lines. The symmetrical character of the curve 33 together with the fact that it is symmetrical with respect to a line parallel to the plane of the centers of the shafts renders this mechanical movement particularly suitable to the operation of double-element reciprocating devices such as the engine shown in Figs. 1 and 2. The center axis of the cylinders need not necessarily lie along the center line of the curve 33 and in Fig. 1 it can be seen that the center line of the cylinders is slightly above the path of travel of the pivot 17 and its center and extreme positions. The relative position of the center line of the reciprocating mechanism and the center line of the curve followed by the pivot 17 will be determined by the characteristics of the machine in which this mechanical movement is being employed; for example, in the illustrated embodiment the cylinders 11 and 12 have been mounted somewhat higher than the center line of the movement of the pivot 17 in order that the piston weight be approximately balanced by a slight upward thrust component. The four identical segments of the curve 33 each represent 90 degrees of the crank shaft arc. The rectilinear stroke of the reciprocating mechanism is the straight line distance between the extremes of the curved path 33 and thus is substantially greater than the throw of the individual cranks. The length of this stroke can be determined by multiplying the diameter of the pitch circle of one of the cranks 22 and 23 by approximately the square root of two. It will readily be apparent that some slight variation of the lengths of the links 18 and 19 might be permissible, however, it is also to be understood that the full advantage of this invention is to be secured when the length is determined by dividing the distance between the centers of the cranks at 45 degrees by the square root of two. The more nearly this can be accomplished the more exactly will the three significant points of the curve 33 lie on a straight line.

Obviously in applications of this invention to machines such as internal combustion engines, it will be desirable to employ several pairs of cylinders in the manner well known in the art. Obviously, when employing multiple sets of cylinders the several cranks are arranged in accordance with well known principles to secure the greatest mechanical advantage and smoothest operating characteristics. It will be noted in this connection that in each pair of cylinders as shown in Fig. 1, both cranks are never in the dead center position at the same time.

By comparison with the drive for the conventional internal combustion engine employing a single connecting rod for each piston, the mechanical movement described above secures approximately a 30% increase of mechanical advantage; and, although the inertia forces of the parts employed in accordance with the present invention may be of the order of 12% more than those in the conventional engine, they are balanced between the cranks. An internal combustion engine embodying this mechanical movement will operate so that approximately 60% of the piston travel occurs during 120 degrees of the crank travel from the top dead center position of the combustion stroke. One result of this mechanical movement is that, when it is applied to an internal combustion engine, the ignition timing of the engine is less critical.

From the foregoing it is readily apparent that there has been provided a simple mechanical movement which lends itself to rugged construction and is suitable for operating reciprocating machines such as internal combustion engines, reciprocating pumps and the like. The mechanism requires only simple links and a simple gear drive such as the two gear arrangement illustrated. Thus, relatively few moving parts are required while securing operation with substantially increased mechanical advantage.

While the invention has been described in connection with a specific embodiment, other applications and modifications will occur to those skilled in the art. Therefore, it is not desired that the invention be limited to the details of construction illustrated and described and it is intended by the appended claims to cover all modifications which fall within the spirit and scope of the invention.

I claim:

1. A mechanical movement comprising a pair of spaced parallel rotatable shafts, means for locking said shafts to rotate at the same angular velocity and in opposite directions, means providing a crank arm on each shaft, crank pins on said arms at equal distances from the axes of their respective shafts, and a pair of links of equal length pivoted to each other at one end and each connected to a respective one of said crank pins at its other end, said crank arms being positioned to lie in the plane of the axes of said shafts when extending to the same sides of their respective shafts, the length of said links being approximately the distance between the axes of said cranks when said cranks are at angles of 45° to said plane divided by the square root of two.

2. A mechanical movement comprising a pair of spaced parallel rotatable shafts, a pair of meshing gears on said shafts for locking said shafts to rotate in opposite directions at the same angular velocity, means providing a crank arm on each shaft, crank pins on said arms at equal distances from the axes of their respective shafts, and a pair of links of equal length pivoted to each other at one end and each connected to a respective one of said crank pins at its other end, said crank arms being positioned to lie in the plane of the axes of said shafts when extending to the same sides of their respective shafts, the length of said links being such that when said cranks lie at angles of 45° to said plane the common pivotal axis of said links intersects a line tangent to the pitch circles of both said gears.

3. A mechanical movement comprising a pair of spaced parallel rotatable shafts, a pair of meshing gears on said shafts for locking said shafts to rotate in opposite directions at the same angular velocity, means providing a crank arm on each shaft, crank pins on said arms at equal distances from the axes of their respective shafts, and a pair of links of equal length pivoted to each other at one end and each connected to a respective one of said crank pins at its other end, said crank arms being positioned to lie in the plane of the axes of said shafts when extending to the same sides of their respective shafts, the length of said links being such that when said cranks lie at angles of 45° to said plane the common pivotal axis of said links lies in a second plane parallel to said first mentioned plane and at a distance therefrom equal to one-half the distance between the axes of said shafts.

4. A mechanical movement comprising a pair of spaced parallel rotatable shafts, means for locking said shafts to rotate at the same angular velocity and in opposite directions, means providing a crank arm on each shaft, crank pins on said arms at equal distances from the axes of their respective shafts, a pair of links of equal length pivoted to each other at one end and each connected to a respective one of said crank pins at their other ends, said cranks being positioned to lie in the plane of the axes of said shafts when extending to the same sides of their respective shafts, the length of said links being approximately the same as the distance between the axes of said cranks when said cranks are at angles of 45° to said plane divided by the square root of two, a reciprocating member mounted to move along a line parallel to said plane and normal to said shafts, and link means pivotally connecting said member and the common pivoted connection of said links to provide a driving connection for transmitting power between said shafts and said member.

References Cited in the file of this patent

UNITED STATES PATENTS

| | | |
|---|---|---|
| 289,019 | Nash | Nov. 27, 1883 |
| 1,128,885 | Livingston | Feb. 16, 1915 |
| 1,701,439 | Canfield | Feb. 5, 1929 |

FOREIGN PATENTS

| | | |
|---|---|---|
| 953,349 | France | May 23, 1949 |
| 1,023,818 | France | Mar. 24, 1953 |